(12) United States Patent
Liu et al.

(10) Patent No.: US 10,818,147 B2
(45) Date of Patent: Oct. 27, 2020

(54) ASSEMBLED TYPE SALES TERMINAL

(71) Applicant: EBN Technology Corp., New Taipei (TW)

(72) Inventors: Tze-Yang Liu, New Taipei (TW); Chien-Long Lin, New Taipei (TW)

(73) Assignee: EBN TECHNOLOGY CORP., New Taipei (TW)

( * ) Notice: Subject to any disclaimer, the term of this patent is extended or adjusted under 35 U.S.C. 154(b) by 231 days.

(21) Appl. No.: 16/163,576

(22) Filed: Oct. 18, 2018

(65) Prior Publication Data

US 2020/0126369 A1     Apr. 23, 2020

(51) Int. Cl.
*G07G 1/00* (2006.01)
*G07G 5/00* (2006.01)
*G07G 1/12* (2006.01)

(52) U.S. Cl.
CPC ............ *G07G 1/0018* (2013.01); *G07G 1/12* (2013.01); *G07G 5/00* (2013.01)

(58) Field of Classification Search
CPC .......... G07G 1/0018; G07G 5/00; G07G 1/12; G06F 1/1601; G06F 1/16
See application file for complete search history.

(56) References Cited

U.S. PATENT DOCUMENTS 6,206,593 B1 * 3/2001 Brenner .................... B41J 3/46
361/679.08

FOREIGN PATENT DOCUMENTS

CN           206921238 U   * 1/2018

* cited by examiner

*Primary Examiner* — Sonji N Johnson
(74) *Attorney, Agent, or Firm* — Chun-Ming Shih; HDLS IPR Services (57) ABSTRACT

An assembled type sales terminal comprises: a flat panel sales terminal and a printer. The flat panel sales terminal includes: an operation display screen, disposed at one end of the flat panel sales terminal; an expansion assembling seat, disposed rotatably at the other end of the flat panel sales terminal, and connected thereto through using a hinge; and a first connection portion, disposed on a lower portion of the expansion assembling seat. The printer includes: a lift cover, having a paper roll placement port disposed thereon; a second connection portion, disposed on the printer, to work in cooperation with the first connection portion; and a placement plane, disposed at a lower portion of the printer. The flat panel sales terminal can be stacked on the printer to form into a body; or the former and the latter can be separated and juxtaposed side by side.

9 Claims, 6 Drawing Sheets

ASSEMBLED TYPE SALES TERMINAL

BACKGROUND OF THE INVENTION

Field of the Invention

The present invention relates to a sales terminal, and in particular to an assembled type sales terminal.

The Prior Arts

In general, sales terminal (also referred to as point-of-sale) has the following advantages in operation: fast and correct account settlement, being able to achieve automation through computer, convenient to obtain sales activities for each of the commodity items, saving manpower and reducing inventory, and being able to achieve optimized marketing strategies effectively. Therefore, sales terminals have been used widely and extensively in retail stores, super markets, convenience stores, restaurants, department stores, and entertainment facilities.

In the early stage, the conventional sales terminal is made by putting a main machine, a keyboard, and a display panel together. The disadvantage of it is that, it occupies quite a lot of space, and is inconvenient to use. To overcome this problem, a flat panel sales terminal is developed, to reduce the space it occupies, and provide more powerful functions.

Further, the flat panel sales terminal can be stacked directly onto a printer, to form integrally into a body, to save the space occupied more effectively. For this kind of design, though the volume of the integrally formed flat panel sales terminal and printer is small, and both must be purchased together at the same time to allow for and facilitate installation, yet the machines involved are liable to crash due to insufficient heat dissipation caused by the reduced volume. Also, this type of fixed configuration renders it difficult to be detached for maintenance and repair, while its functional expandability is limited, and it is not able to satisfy the actual requirements of various users. Besides, its fixed configuration lacks flexibility and mobility, and thus making it rather difficult to fit it into the space arrangements and limitations of the users.

Therefore, presently, the design of the sales terminal and the printer is not quite satisfactory, and it leaves much room for improvement.

SUMMARY OF THE INVENTION

In view of the problems and drawbacks of the prior art, the present invention provides an assembled type sales terminal, to overcome the shortcomings of the prior art.

The present invention provides an assembled type sales terminal, comprising: a flat panel sales terminal and a printer. The flat panel sales terminal 1 includes: a display screen, disposed at one end of the flat panel sales terminal; an expansion assembling seat, disposed rotatably at the other end of the flat panel sales terminal, and connected thereto through a hinge; and a first connection portion, disposed on a lower portion of the expansion assembling seat. The printer includes: a lift cover, having a paper roll placement port disposed thereon; a second connection portion, disposed on the printer, corresponding to and working in cooperation with the first connection portion; and a placement plane, disposed at a lower portion of the printer.

Wherein, through using the first connection portion and the second connection portion, the flat panel sales terminal can be stacked onto the printer to form into a body, to reduce its volume and the space occupied. Or, alternatively, the flat panel sales terminal and the printer can be separated, to be juxtaposed side by side, to fit them into the space arrangements and limitations of various users.

In an aspect of the present invention, in an assembled type sales terminal, the printer further includes: an extension power line, disposed on the printer, a middle section of the extension power line is disposed in the printer; a power socket, disposed at one end of the extension power line, and is located on a backside of the printer; a power plug, disposed at the other end of the extension power line, and extendable through an upper portion of the printer; and a wire outlet port, disposed on the expansion assembling seat, for the power plug to insert therein. As such, after being connected to a power supply, the flat panel sales terminal and the printer can be powered on or powered off simultaneously.

In another aspect of the present invention, on the expansion assembling seat is disposed a first placement portion and a second placement portion adjacent to each other. On the first placement portion is disposed a power supply, on the second placement portion is disposed an expansion module, so that different expansion modules can be used to produce the assembled type sales terminals of various functions depending on user's requirements. Further, a removable upper cover is disposed above and to cover the expansion assembling seat.

Further scope of the applicability of the present invention will become apparent from the detailed descriptions given hereinafter. However, it should be understood that the detailed descriptions and specific examples, while indicating preferred embodiments of the present invention, are given by way of illustration only, since various changes and modifications within the spirit and scope of the present invention will become apparent to those skilled in the art from the detailed descriptions.

BRIEF DESCRIPTION OF THE DRAWINGS

The related drawings in connection with the detailed descriptions of the present invention to be made later are described briefly as follows, in which.

DETAILED DESCRIPTION OF THE PREFERRED EMBODIMENT

The purpose, construction, features, functions and advantages of the present invention can be appreciated and understood more thoroughly through the following detailed descriptions with reference to the attached drawings.

Refer to FIGS. 1 to 4 respectively for a perspective view of an assembled type sales terminal according to an embodiment of the present invention; an exploded view of an assembled type sales terminal according to an embodiment of the present invention; a side view of an assembled type sales terminal according to an embodiment of the present invention; and a cross section view of an assembled type sales terminal according to an embodiment of the present invention.

As shown in FIGS. 1 to 4, the present invention provides an assembled type sales terminal, that includes: a flat panel sales terminal 1 and a printer 2. The flat panel sales terminal 1 includes: a display screen 11, disposed at one end of the flat panel sales terminal 1; an expansion assembling seat 12, disposed rotatably at the other end of the flat panel sales terminal 1, and connected thereto through a hinge 111; and a first connection portion 15, disposed on a lower portion of the expansion assembling seat 12. The printer 2 includes: a lift cover 211, having a paper roll placement port 21 disposed thereon; a second connection portion 25, disposed on the printer 2, corresponding to and working in cooperation with the first connection portion 15; and a placement plane 22, disposed at a lower portion of the printer 2.

The first connection portion 15 is formed by a placement plane 125 located at a bottom portion of the expansion assembling seat 12, and the second connection portion 25 is formed by an indent area 225 on the printer 2. In stacking the operation display screen 11 onto the printer 2, the placement plane 125 on the bottom portion of the expansion assembling seat 12 can be inserted and embedded into the indent area 225 of the printer 2. But the present invention is not limited to this, other types of assembly (not shown) can be used to achieve stacking the flat panel sales terminal 1 onto the printer 2.

A connection element 55 is disposed between the first connection portion 15 and the second connection portion 25, to fix and lock them together through using a screw 155 and a screw hole 255. But the present invention is not limited to this, the connection element 55 can be a fastening ear, a fastening groove, or other means (not shown) to achieve fixing and locking.

Figure 1:
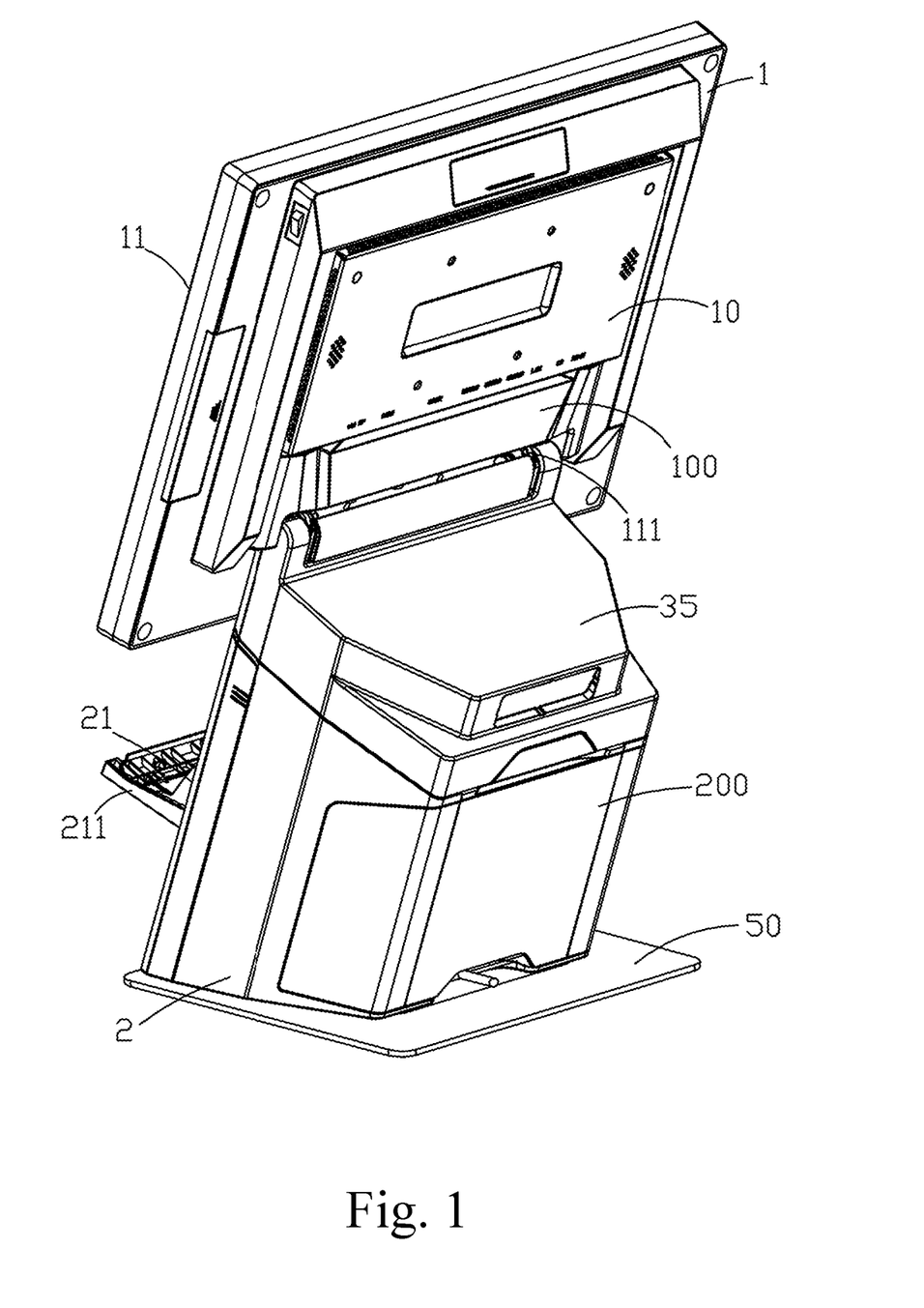
FIG. 1 is a perspective view of an assembled type sales terminal according to an embodiment of the present invention.
Figure 2:
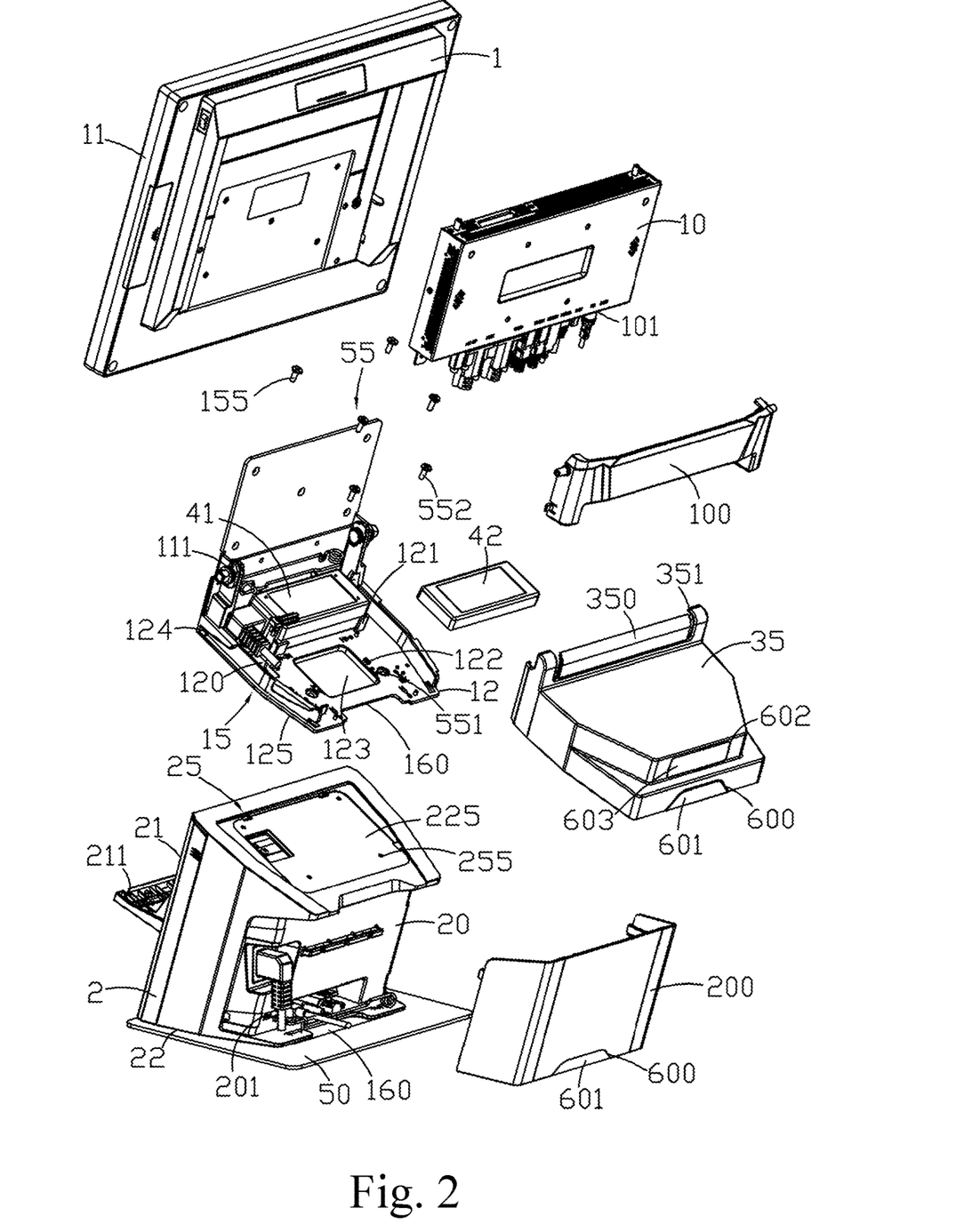
FIG. 2 is an exploded view of an assembled type sales terminal according to an embodiment of the present invention.
Figure 3:
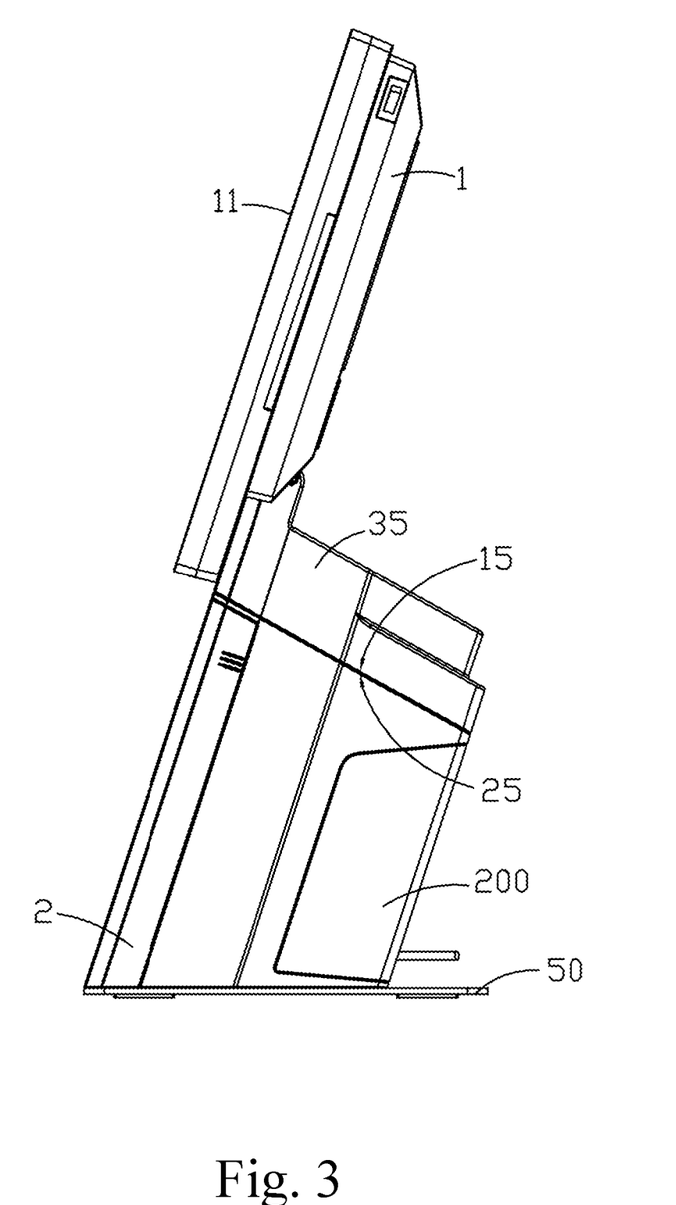
FIG. 3 is a side view of an assembled type sales terminal according to an embodiment of the present invention.
Figure 4:
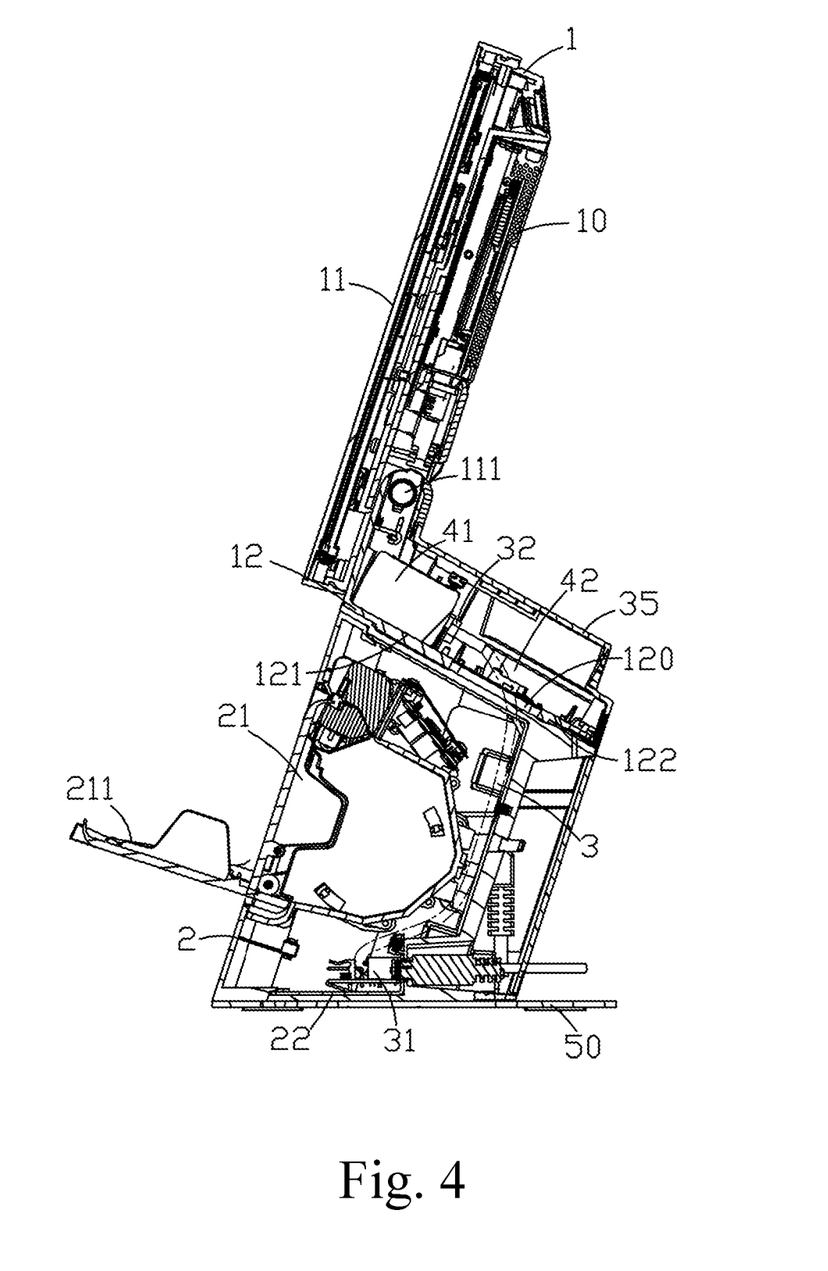
FIG. 4 is a cross section view of an assembled type sales terminal according to an embodiment of the present invention.

In an embodiment of the present invention, as shown in FIG. 4, the printer 2 further includes: an extension power line 3, disposed on the printer 2, a middle section of the extension power line 3 is disposed in the printer 2; a power socket 31, disposed at one end of the extension power line 3, and is located on a backside of the printer 2; a power plug 32, disposed at the other end of the extension power line 3, and extendable through an upper portion of the printer 2; and a wire outlet port 120, disposed on the expansion assembling seat 12, for the power plug 32 to insert therein. As such, after being connected to a power supply, the flat panel sales terminal 1 and the printer 2 can be powered on or powered off simultaneously.

Figure 5:
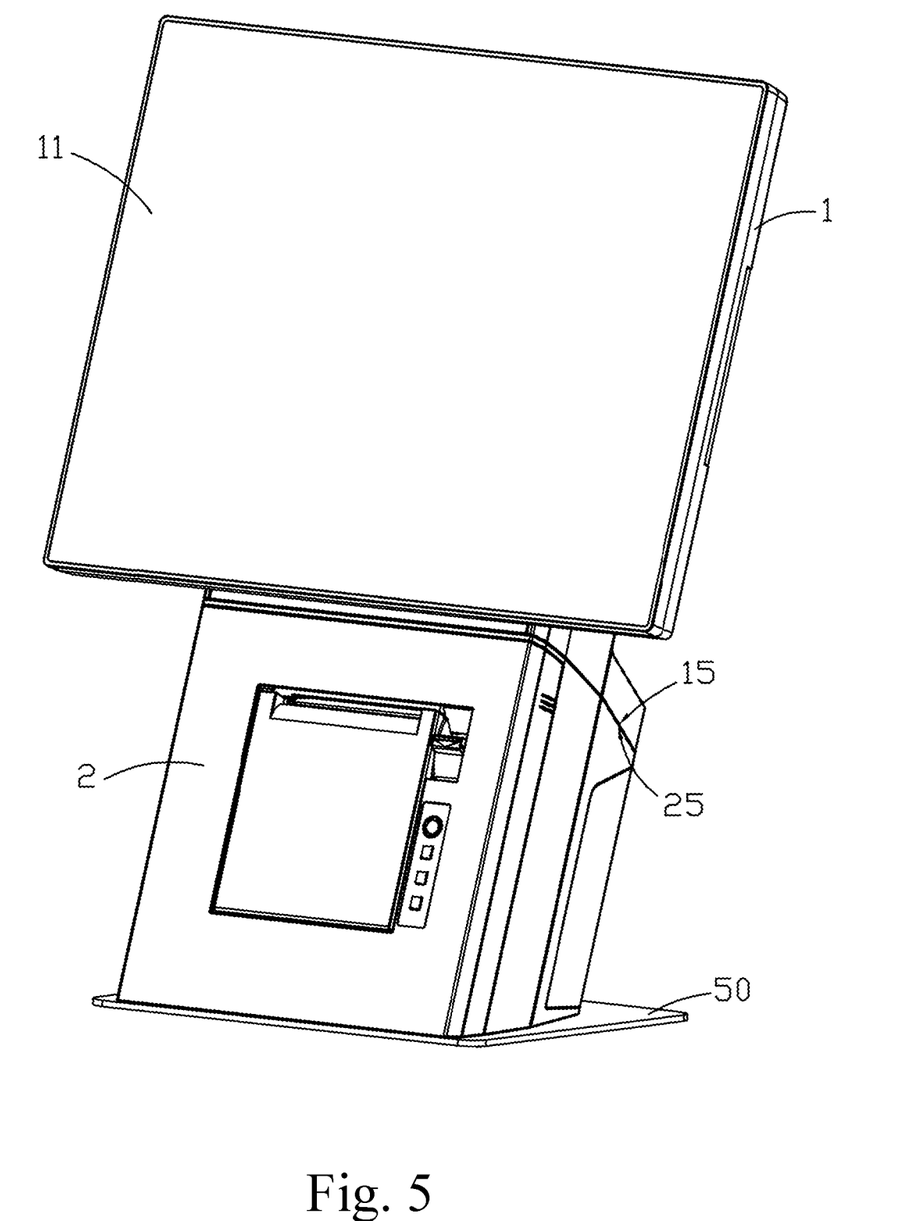
FIG. 5 is a schematic diagram of an assembled type sales terminal placed in a stack according to an embodiment of the present invention.
Figure 6:
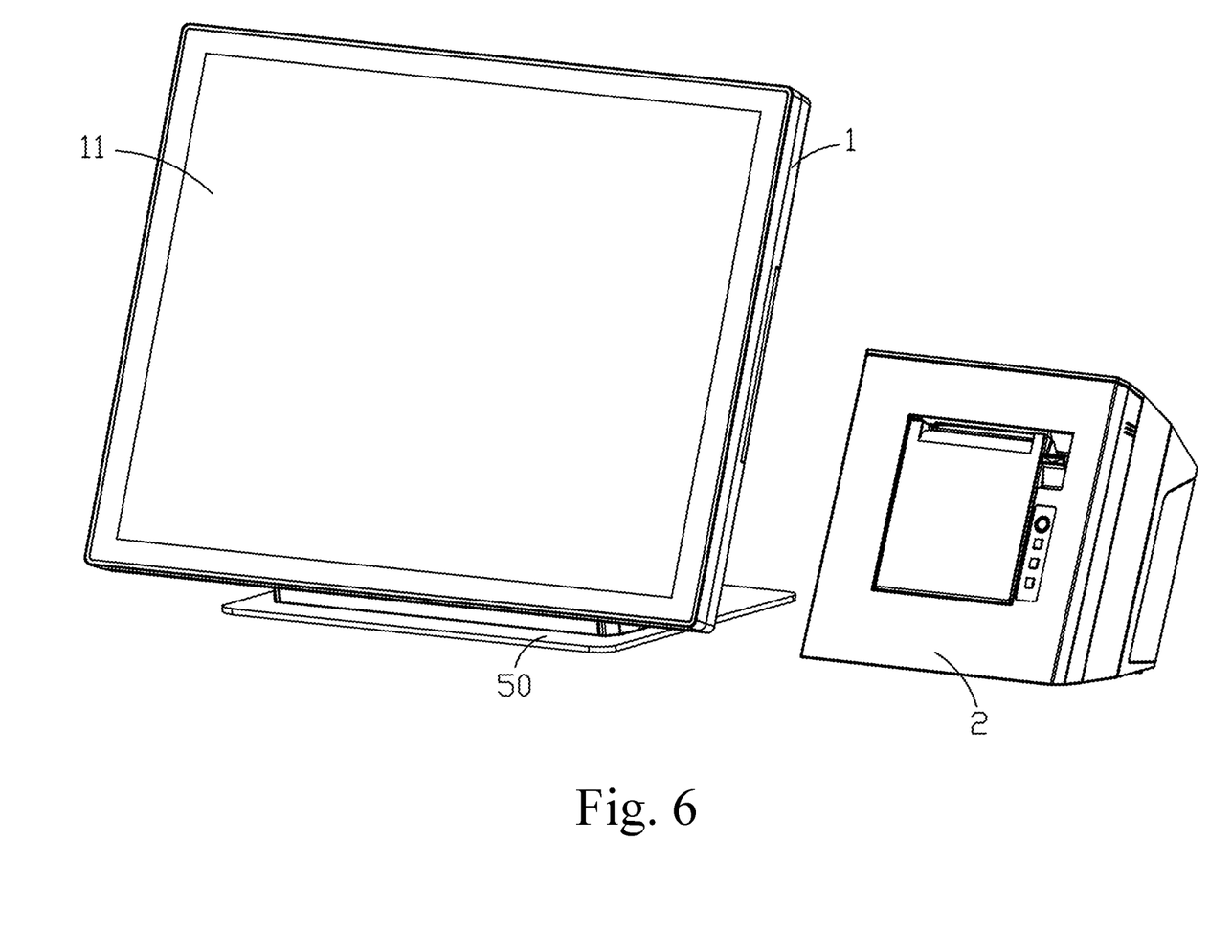
FIG. 6 is a schematic diagram of an assembled type sales terminal placed in juxtaposition side by side according to an embodiment of the present invention.

As shown in FIGS. 5 and 6, through using the first connection portion 15 and the second connection portion 25, the flat panel sales terminal 1 can be stacked on the printer 2 to form into a body. Alternatively, the flat panel sales terminal 1 and the printer 2 can be separated, to be juxtaposed side by side, to fit them into the space arrangements and limitations of various users.

As shown in FIGS. 1 to 4, the operation display screen 11 is disposed in the front of the flat panel sales terminal 1. In a backside of the operation display screen 11 is disposed a main machine box 10. On one end of the main machine box 10 is disposed a plurality of insertion hole seats 101 for receiving the insertion wires. A removable cover plate 100 is disposed in the backside of the operation display screen 11 to partially cover the insertion wires, to give it a pleasing appearance.

The printer 2 is of a slant trapezoid shape, but the present invention is not limited by this. A paper roll placement port 21 is disposed in the front of the printer 2, on a backside of the printer 2 is further provided with a rear waist portion 20 having a shallow indent, and on the shallow indent is disposed the plurality of insertion hole seats 201 for receiving the insertion wires. A removable back cover 200 is disposed corresponding to the rear waist portion 20 to cover the insertion wires to give it a pleasing appearance.

A bottom plate 50 is disposed detachably under the printer 2 or the expansion assembling seat 12, to increase stability when placing the flat panel sales terminal 1 onto the printer 2, or when placing the flat panel sales terminal 1 side by side with the printer 2 in juxtaposition.

On the expansion assembling seat 12 is disposed a first placement portion 121 and a second placement portion 122 adjacent to each other. On the first placement portion 121 is disposed a power supply 41, and on the second placement portion 122 is disposed an expansion module 42, to facilitate the user to choose among various customized expansion modules 42, to produce a series of assembled type sales terminals having different configurations and different functions.

A removable upper cover 35 is disposed above and to cover the expansion assembling seat 12. The removable upper cover 35 is of an inverted bucket shape, to match the shape of the upper portion of the printer 2. An extension cover plate 350 is disposed at one end of the removable upper cover 35 corresponding to a backside of the operation display screen 11. Two grooves 351 are disposed respectively on both sides of the extension cover plate 350 corresponding to the hinge 111.

A fasten rim side plate 124 is disposed above the expansion assembling seat 12, to be fastened and fixed to an inner rim of the removable upper cover 35. The wire outlet port 160 is disposed on the bottom plate 50 opposite to a rear section of the expansion assembling seat 12, for the wires to pass through. On the removable upper cover 35 and in a rear section of the removable back cover 200 are disposed respectively a wire outlet port 600 and a corresponding seal cover plate 601.

Two wire outlet ports 600, 602 are disposed respectively on an upper and a lower steps at an end of the removable upper cover 35, and two corresponding seal cover plates 601, 603 are disposed respectively on the upper and the lower steps at the end of the removable upper cover 35, to facilitate the user to choose the most suitable wire outlet position for various different expansion modules 42.

A hollow window 123 is disposed on the second placement portion 122 of the expansion assembling seat 12, and a screw hole 551 is provided on each of two sides of the hollow window 123, for each of two screws 552 to connect, lock, and fix the hollow window 123 to the expansion module 42, or for each of two screws 552 to connect, lock, and fix the hollow window 123 to a set of racks (not shown) to raise its elevation, and then fix the set of racks to the expansion module 42.

The expansion module 42 can be formed by the rechargeable batteries and the power supply 41. On the expansion module 42 is provided with at least a power input terminal and two power output terminals of different voltages for outputting power. The expansion module 42 can also be a hard disk for storing data, a communication transmission hub, a USB hub (not shown), etc.

Refer to FIGS. 1-6, the advantages of the assembled type sales terminal of the present invention are explained in detail as follows: by using the first connection portion 15 and the second connection portion 25, located respectively on the expansion assembling seat 12 of the flat panel sales terminal 1, and the printer 2, the flat panel sales terminal 1 can be stacked and fixed onto the printer 2, to form into a body, to reduce its volume and the space occupied. Or, alternatively, the flat panel sales terminal 1 and the printer 2 can be separated, to be juxta-positioned side by side. However, for the two configurations mentioned above, the bottom plate 50 can be used to increase the stability of both, and to fit them into the space arrangements and limitations of various users.

In application, when the flat panel sales terminal 1 is stacked onto the printer 2, the extension power line 3 of the printer 2 can be used to connect the flat panel sales terminal 1 and the printer 2 together electrically. As such, after being connected to a power supply, the flat panel sales terminal 1 and the printer 2 can be powered on or powered off simultaneously, to increase convenience of usage.

On the expansion assembling seat 12 is disposed a first placement portion 121 and a second placement portion 122, used to install the various expansion modules 4. Then, through various arrangements of wire outlet ports on the removable upper cover 35 and removable back cover 200, the user is able to obtain a series of assembled type sales terminals having different configurations and different functions, thus fulfilling the user's requirements.

The above detailed description of the preferred embodiment is intended to describe more clearly the characteristics and spirit of the present invention. However, the preferred embodiments disclosed above are not intended to be any restrictions to the scope of the present invention. Conversely, its purpose is to include the various changes and equivalent arrangements which are within the scope of the appended claims.

What is claimed is:

1. An assembled type sales terminal, comprising:
   a flat panel sales terminal, including:
      a display screen, disposed at one end of the flat panel sales terminal,
      an expansion assembling seat, disposed rotatably at the other end of the flat panel sales terminal, and connected thereto through a hinge,
      a first connection portion, disposed on a lower portion of the expansion assembling seat; and
   a printer, including:
      a lift cover, having a paper roll placement port disposed thereon,
      a second connection portion, disposed on the printer, corresponding to and working in cooperation with the first connection portion,
      a placement plane, disposed at a lower portion of the printer,
      an extension power line, disposed on the printer, a middle section of the extension power line is disposed in the printer,
      a power socket, disposed at one end of the extension power line, and is located on a backside of the printer,
      a power plug, disposed at the other end of the extension power line, and extendable through an upper portion of the printer, and
      a wire outlet port, disposed on the expansion assembling seat, for the power plug to insert therein,
   wherein, through using the first connection portion and the second connection portion, the flat panel sales terminal is stacked on the printer to form into a body, or the flat panel sales terminal and the printer are separated, to be juxtaposed side by side.

2. The assembled type sales terminal as claimed in claim 1, wherein on the expansion assembling seat is disposed a first placement portion and a second placement portion adjacent to each other, on the first placement portion is disposed a power supply, and on the second placement portion is disposed an expansion module, and a movable upper cover is disposed above and to cover the expansion assembling seat.

3. The assembled type sales terminal as claimed in claim 2, wherein a fasten rim side plate is disposed the expansion assembling seat, to be fastened and fixed to an inner rim of the removable upper cover, the removable upper cover is of an inverted bucket shape, and an extension cover plate is disposed at one end of the removable upper cover corresponding to a backside of the operation display screen, two grooves are disposed respectively on both sides of the extension cover plate corresponding to the hinge, two wire outlet ports, are disposed respectively in an upper and a lower steps at an end of the removable upper cover, and two seal cover plates are disposed respectively in the upper and the lower steps at the end of the removable upper cover.

4. The assembled type sales terminal as claimed in claim 2, wherein a hollow window is disposed on the second placement portion of the expansion assembling seat, and a screw hole is provided on each of two sides of the hollow window, for each of two screws to connect, lock, and fix the hollow window to the expansion module.

5. The assembled type sales terminal as claimed in claim 2, wherein the hollow window is disposed on the second placement portion of the expansion assembling seat, and the screw hole is provided on each of two sides of the hollow window, for each of two screws to connect, lock, and fix the hollow window to a set of racks to raise its elevation, and then fix the set of racks to the expansion module.

6. The assembled type sales terminal as claimed in claim 2, wherein the expansion module is formed by rechargeable batteries and the power supply, and on the expansion module is disposed at least a power input terminal and two power output terminals of different voltages.

7. The assembled type sales terminal as claimed in claim 2, wherein a connection element is disposed between the first connection portion and the second connection portion to connect and fix the first connection portion and the second connection portion together, the first connection portion is formed by a placement plane located at a bottom portion of the expansion assembling seat, and the second connection portion is formed by an indent area on the printer.

8. The assembled type sales terminal as claimed in claim 1, wherein in a backside of the operation display screen is disposed a main machine box, on one end of the main machine box is disposed a plurality of insertion hole seats for receiving insertion wires, and a removable cover plate is disposed in the backside of the operation display screen to partially cover the insertion wires; and the printer is of a slant trapezoid shape, on a backside of the printer is further provided with a rear waist portion having a shallow indent, on the shallow indent is disposed the plurality of insertion hole seats for receiving insertion wires, and a removable back cover is provided corresponding to a rear waist portion to cover the insertion wires, and a bottom plate is disposed detachably under the printer or the expansion assembling seat, to increase stability for placing the assembled type sales terminal thereon.

9. The assembled type sales terminal as claimed in claim 8, wherein a wire outlet port is disposed on the bottom plate opposite to a rear section of the expansion assembling seat, for wires to pass through; and on the removable upper cover and on a rear section of the removable back cover are disposed respectively another wire outlet port and a corresponding seal cover plate.

\* \* \* \* \*